Figure 1:
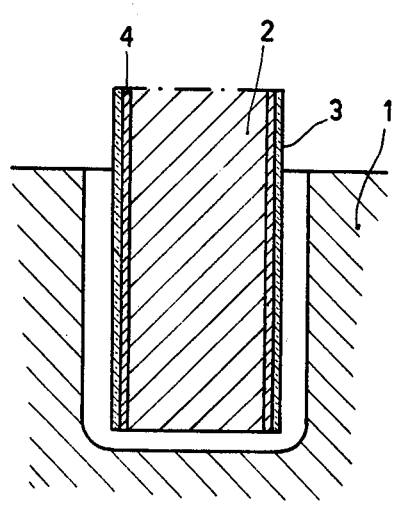

United States Patent [19]

Verspui

[11] 4,136,006

[45] Jan. 23, 1979

[54] ELECTRODE FOR ELECTROCHEMICAL MACHINING

[75] Inventor: Gerrit Verspui, Eindhoven, Netherlands

[73] Assignee: U.S. Philips Corporation, New York, N.Y.

[21] Appl. No.: 841,676

[22] Filed: Oct. 13, 1977

[30] Foreign Application Priority Data

Oct. 20, 1976 [NL] Netherlands .................. 7611566

[51] Int. Cl.² .................... C25D 17/10; B23P 1/02
[52] U.S. Cl. ................... 204/290 F; 204/129.55
[58] Field of Search ......... 204/224 M, 290 R, 129.55, 204/290 F

[56] References Cited

U.S. PATENT DOCUMENTS

| | | | |
|---|---|---|---|
| 3,352,770 | 11/1967 | Crawford et al. | 204/129.55 X |
| 3,485,744 | 12/1969 | Schaffner | 204/290 R |
| 3,972,797 | 8/1976 | Hagen et al. | 204/290 R |

FOREIGN PATENT DOCUMENTS 424449  3/1975  U.S.S.R. ................. 204/290 R

*Primary Examiner*—John H. Mack
*Assistant Examiner*—D. R. Valentine
*Attorney, Agent, or Firm*—David R. Treacy; Bernard Franzblau

[57] ABSTRACT

An electrode for the electrochemical machining of electrically conductive workpieces, which electrode has a layer of polycrystalline silicon carbide via an insulator layer which is at most 0.5 $\mu$m thick.

8 Claims, 2 Drawing Figures

ELECTRODE FOR ELECTROCHEMICAL MACHINING

The invention relates to an electrode for the electrochemical machining, in particular metal-removing, of electrically conductive workpieces and to products manufactured by means of such an electrode.

The electrochemical metal removal takes place in an electrolyte solution in which the workpiece is placed as an anode, the tool as a cathode, between which two electrodes a current is passed. The workpiece connected as an anode dissolves, for example in the form of metal hydroxide while hydrogen is evolved at the surface of the tool. The advantage of said metal removing method is that no wear or attack of the tool takes place.

The method is described inter alia in the Handbook "Electrochemical Machining" of A. E. de Barr and D. A. Oliver published by Mac. Donald, London (1968) and in two articles by Kao-Wenn Mao "CM study in a closed-cell system" in J. Electrochem. Soc. 118, pages 7 et seq. (1971).

The usual electrolytes consist of solutions of a salt in water, as a rule of NaCl or $NaNO_3$ solutions.

In order to obtain sufficient accuracy in this method, the distance between the tool and the workpiece is kept small, for example 0.01–0.1 mm. In order to keep the distance more or less constant, the tool must be moved towards the workpiece at a certain velocity ("feed") i.e. at a velocity which is equal to the rate of dissolution of the workpiece. The electrolyte is pumped through the electrode gap at a rather high rate so as to remove the formed metal hydroxide, the evolved hydrogen and the evolved heat. The heat evolution in the liquid electrolyte is rather large because in practice electrolysis current densities up to 500 A per $cm^2$ of machined surface occur.

The accuracy of said machining method, which in itself is not so large, is considerably improved by providing insulation on the electrode at the area where no current passage is desired.

Figure 2:
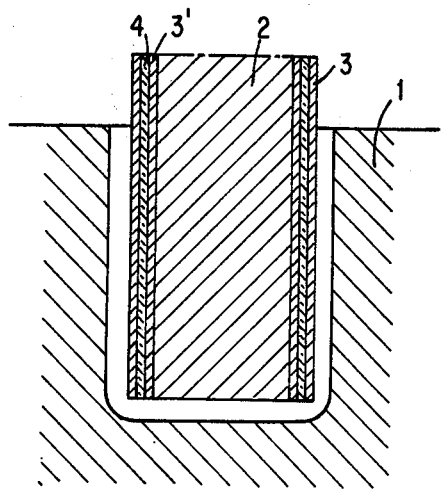

By way of example, in the accompanying drawing FIGS. 1 and 2 show first and second embodiments of an electrode for making grooves.

In the drawing, element 1 is the workpiece, 2 is a band-shaped electrode in a cross-section at right angles to the smallest dimension and 3 is the insulation of the electrode.

When a high accuracy of the machining is desired, as meant above, it is of importance that said layer (3) should be chosen to be as thin as possible, for example 0.01 mm or less.

U.S. Pat. No. 3,972,797 discloses an electrode which is locally covered with a layer of a polycrystalline semiconductor, in particular consisting of two sublayers of semiconductors of different natures and/or of the n-or p-conductivity type. In one embodiment the semiconductor is silicon carbide which in two sublayers is n-type or p-type conductive.

Upon forming said sublayers by means of chemical deposition via the gaseous phase, an accurate adjustment of the various process parameters is required so as to obtain an insulation layer having low leakage current. This is rather difficult to realize in particular in polycrystalline silicon carbide.

The invention provides a locally insulated electrode which can be manufactured in a simple and reproduceable manner.

The electrode according to the invention, which is covered locally with an insulating layer 3 (FIG. 1) of polycrystalline silicon carbide is characterized in that an intermediate layer 4 is also present in a thickness of at most 0.5 $\mu$m consisting of an inorganic insulator having a resistivity of at least $10^6$ Ohm.cm.

Useful layers of said insulator material are silicon nitride, silicon oxide, boron nitride and aluminium oxide. Layers of these materials as such, however, are unfit use as an insulation layer for an electrode for electrochemical machining operations because holes and cracks cannot be avoided so that too high leakage currents occur. Silicon carbide layers, however, can easily be obtained in a quality which is impervious to liquid electrolytes.

As regards the coefficient of linear expansion of silicon carbide (36 − 49 × $10^{-7}$) it excellently matches tungsten (46 × $10^{-7}$) and to a slightly smaller extent also molybdenum (57 × $10^{-7}$).

The inorganic insulator should be present in a thickness of at most 0.5 $\mu$m, either as a layer between the basic metal 2 of the electrode and the SiC layer 3, as in FIG. 1, or between two SiC layers 3 and 3, as in FIG. 2. The maximum thickness is associated with the coefficient of expansion of the $Si_3N_4$ (dependent on the crystal form, between 15 and 30 × $10^{-7}$) since otherwise the too large difference with the other materials becomes detrimental for the adhesion. The minimum required thickness is approximately 100 Å.

The most efficacious method of manufacturing the layers is by means of chemical deposition from the gaseous phase.

The electrodes according to the invention show very low leakage currents at the area of the insulation layer, for example, 0.04 − 2 × $10^{-6}$ A/$cm^2$ at 20 V.

The invention is also embodied in products, such as razor caps having slots or holes which have been manufactured by means of the electrochemical machining method while using the present electrodes.

Two embodiments will now be described.

1. A tungsten tape having a length of 30 cm, a width of 5 mm and a thickness of 0.15 mm is exposed, at a temperature of 800° C., for 4 minutes to a gas flow of 1370 $cm^3$/minute consisting of 1320 $cm^3$ of $NH_3$ and 50 $cm^3$ of $H_2$ which contains 5% $SiH_4$. An approximately 0.3 $\mu$m thick $Si_3N_4$ layer is formed on the tape surface by pyrolysis. After this experiment, the reactor is evacuated and rinsed with $H_2$ gas. The tape is then heated at 1300° C. for 20 seconds in a gas flow of 1700 $cm^3$ of $H_2$ containing 9% by volume of $(CH_3)_2 SiCl_2$. As a result of this approximately 5 $\mu$m of SiC is deposited on the $Si_3N_4$-coated tungsten electrode. $Si_3N_4$ has a resistivity of $10^{12}$ Ohm.cm.

An electrode having a length of 1 cm is made from the resulting tape having a double layer of $Si_3N_4$ and SiC (overall thickness approximately 5 $\mu$m) in the embodiment of the Figure, the layer being absent at the end face and being removed mechanically at the area of the clamping so as to permit current passage and electrical contact, respectively. As an electrolyte in the electrochemical metal-removal process an aqueous $NaNO_3$ solution having a conductivity of 0.10 $Ohm^{-1} cm^{-1}$ is used which is circulated at a velocity of 20 m/sec. At the area of the uncovered electrode surface the current density is approximately 100 A/$cm^2$ and at the area of the double layer $Si_3N_4$-SiC the current density is $10^{-3}$ A/$cm^2$ at an operating voltage of 10 V. An electrode covered only with a 10$\mu$ thick layer of SiC consisting of two sublayers, one of the n-conductivity type and one of the p-conductivity type, shows a leakage current of 0.2 A/cm$^2$ at the same operating voltage.

2. Analogous to the previous example an insulating layer of boron nitride (BN) is obtained by heating the tungsten tape of Example 1 at 1600° C. for 1 minute in a H$_2$ — NH$_3$ — BCl$_3$ flow of 0.5 mm Hg pressure. The gas flow has a velocity of 0.5 l of H$_2$/min and contains 14% NH$_3$ and 10% BCl$_3$. This is passed through the reactor at the said subambient pressure. After one minute a 0.4 μm thick BN layer has been deposited on the tungsten tape. Boron nitride has a resistivity of 10$^{14}$ Ohm.cm. An approximately 5 μm thick SiC layer is then deposited in the manner of Example 1.

An electrode made from the tape thus obtained and used in the embodiment and in the manner of Example 1 has properties which are comparable therewith.

What is claimed is:

1. An electrode for the electrochemical machining of electrically conductive workpieces in an electrolyte solution comprising, an electrically conductive member having a coefficient of linear expansion similar to that of silicon carbide, said member being covered locally with an insulating layer of polycrystalline silicon carbide, an intermediate layer being present between said member and said insulating layer in a thickness of at most 0.5 μm and comprising an inorganic insulator having a resistivity of at least 10$^6$ Ohm.cm.

2. An electrode as claimed in claim 1, characterized in that the layer of inorganic insulator is situated between two silicon carbide layers.

3. An electrode for electrochemically machining an electrically conductive workpiece in an electrolyte solution comprising, a coat of insulation material locally covering the electrode at areas where current flow is undesired, said coat of insulation comprising first and second superimposed layers, the first layer comprising an inorganic insulator which is at most 0.5 μm thick and has a resistivity of at least 10$^6$ Ohm-cm and is sandwiched between the electrode and the second insulating layer which is made of a semiconductor polycrystalline material having a coefficient of expansion similar to that of the electrode material.

4. An electrode as claimed in claim 3 wherein said coat of insulation includes a third superimposed insulation layer of a semiconductor polycrystalline material similar to the material of the second layer and which is sandwiched between the electrode and the first insulation layer.

5. An electrode as claimed in claim 4 wherein said second and third insulation layers each comprise a layer of silicon carbide material.

6. An electrode as claimed in claim 3 wherein said second layer is made of polycrystalline silicon carbide.

7. An electrode as claimed in claim 6 wherein said inorganic insulator material is chosen from the group consisting of silicon nitride, silicon oxide, boron nitride and aluminum oxide.

8. An electrode as claimed in claim 6 wherein the electrode material comprises tungsten.

* * * * *

UNITED STATES PATENT AND TRADEMARK OFFICE
CERTIFICATE OF CORRECTION

PATENT NO. : 4,136,006
DATED : January 23, 1979
INVENTOR(S) : GERRIT VERSPUI

It is certified that error appears in the above-identified patent and that said Letters Patent are hereby corrected as shown below:

Column 1, line 24, "NaCf" should be --NaCl--;
         line 29, after "("feed")" insert --,--.

Column 2, line 10, after "unfit" insert the word --for--;
         line 21, after "layer" insert the number --4--;
         line 23, "3," should be --3',--.

Signed and Sealed this

Tenth Day of July 1979

[SEAL]

Attest:

Attesting Officer

LUTRELLE F. PARKER
Acting Commissioner of Patents and Trademarks